United States Patent
Mao (10) Patent No.: US 12,166,924 B2
(45) Date of Patent: Dec. 10, 2024

(54) CALL PROCESSING METHOD AND ELECTRONIC DEVICE

(71) Applicant: VIVO MOBILE COMMUNICATION CO., LTD., Dongguan (CN)

(72) Inventor: Ruichen Mao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/951,070

(22) Filed: Sep. 22, 2022

(65) Prior Publication Data

US 2023/0013341 A1 Jan. 19, 2023

Related U.S. Application Data

(63) Continuation of application No. PCT/CN2021/082653, filed on Mar. 24, 2021.

(30) Foreign Application Priority Data

Mar. 26, 2020 (CN) .......................... 202010223522.3

(51) Int. Cl.
*H04M 3/00* (2024.01)
*H04L 12/66* (2006.01)
(Continued)

(52) U.S. Cl.
CPC .................................. *H04M 3/566* (2013.01)

(58) Field of Classification Search
CPC ........ H04M 3/568; H04M 3/569; H04M 3/56; H04M 3/566; H04M 2203/5072;
(Continued)

(56) References Cited

U.S. PATENT DOCUMENTS

| 9,118,734 B2 | 8/2015 | Kaminsky | |
| 2005/0135583 A1* | 6/2005 | Kardos | H04M 3/56 |
| | | | 379/202.01 |

(Continued)

FOREIGN PATENT DOCUMENTS

| CN | 106603254 A | 4/2017 |
| CN | 107241113 A | 10/2017 |

(Continued)

OTHER PUBLICATIONS

International Search Report issued in corresponding International Application No. PCT/CN2021/082653, mailed Jun. 15, 2021, 4 pages.

(Continued)

*Primary Examiner* — Kharye Pope
(74) *Attorney, Agent, or Firm* — IPX PLLC (57) ABSTRACT

A call processing method and an electronic device are provided. The method is performed by an electronic device and includes: in a case that a call is connected successfully, obtaining the number of speakers in the current call. The method further includes: when the number of speakers is greater than a preset threshold, determining whether a user of the electronic device is a target user. The method additionally includes: if the user of the electronic device is a non-target user, disabling a speaking channel of the electronic device; and if the user of the electronic device is a target user, keeping the speaking channel of the electronic device on.

18 Claims, 5 Drawing Sheets

(51) Int. Cl.
*H04M 3/56* (2006.01)
*H04M 5/00* (2006.01)

(58) Field of Classification Search
CPC ............ H04M 3/567; H04M 2250/62; H04M 2250/74; H04M 3/562; H04M 2201/41; H04L 65/403; H04L 12/1822; H04L 12/1827; H04L 65/4038; H04L 12/1818; G10L 17/00; G10L 25/78; G10L 2021/02087; G10L 15/222; H04N 7/15; H04N 7/152
USPC ................... 379/202.01, 158, 93.21, 205.01; 370/260, 352, 261, 353, 356
See application file for complete search history.

(56) References Cited

U.S. PATENT DOCUMENTS

| | | | | |
|---|---|---|---|---|
| 2007/0086365 | A1* | 4/2007 | Chen | H04M 7/0063 370/260 |
| 2009/0129295 | A1* | 5/2009 | Shibata | H04M 3/56 455/518 |
| 2009/0214016 | A1* | 8/2009 | O'Sullivan | H04M 3/56 379/202.01 |
| 2009/0215483 | A1* | 8/2009 | Albertsson | H04W 4/10 455/519 |
| 2011/0225013 | A1* | 9/2011 | Chavez | G06Q 10/109 704/235 |
| 2012/0140681 | A1* | 6/2012 | Kaminsky | H04L 65/403 370/261 |
| 2013/0022189 | A1* | 1/2013 | Ganong, III | G10L 15/00 379/202.01 |
| 2013/0051543 | A1* | 2/2013 | Mcdysan | H04M 3/4286 379/202.01 |
| 2016/0142451 | A1* | 5/2016 | Ouyang | H04L 65/403 715/728 |
| 2018/0367483 | A1 | 12/2018 | Rodriguez et al. | |
| 2019/0394057 | A1* | 12/2019 | Bujnowski | H04L 12/1822 |
| 2020/0314158 | A1* | 10/2020 | Fardig | H04N 7/15 |
| 2022/0303502 | A1* | 9/2022 | Fisher | G06F 3/165 |

FOREIGN PATENT DOCUMENTS

| | | |
|---|---|---|
| CN | 107302640 A | 10/2017 |
| CN | 108495074 A | 9/2018 |
| CN | 108540500 A | 9/2018 |
| CN | 110099182 A | 8/2019 |
| CN | 110445781 A | 11/2019 |
| CN | 110912868 A | 3/2020 |
| CN | 111447223 A | 7/2020 |

OTHER PUBLICATIONS

First Office Action issued in related Chinese Application No. 202010223522.3 mailed Nov. 8, 2021, 7 pages.
Second Office Action issued in related Chinese Application No. 202010223522.3 mailed Apr. 14, 2022, 6 pages.
Third Office Action issued in related Chinese Application No. 202010223522.3 mailed Jul. 26, 2022, 8 pages.

* cited by examiner

CALL PROCESSING METHOD AND ELECTRONIC DEVICE

CROSS-REFERENCE TO RELATED APPLICATIONS

This application is a continuation of International Application No. PCT/CN2021/082653, filed on Mar. 24, 2021, which claims priority to Chinese Patent Application No. 202010223522.3 filed on Mar. 26, 2020. The entire contents of each of the above-referenced applications are expressly incorporated herein by reference.

TECHNICAL FIELD

The present disclosure relates to the field of communications technologies, and in particular, to a call processing method and an electronic device.

BACKGROUND

Currently, with the development of technologies, a call function of an electronic device may be further applied to a remote conference to share content of a camera and a microphone of an attendee in real time. The attendee has rights to enable or disable the camera and the microphone, and a conference moderator also has rights of whether to mute another attendee.

However, currently, when a remote conference is being held, because time is required in network transmission, there is a delay in speaking of an attendee, which often causes an award phenomenon that two or more attendees speak at the same time and keep silent when finding a speech conflict. In addition, many users have no awareness of actively turning off a microphone, and often bring out-of-scene noise into a conference when others speak, which greatly reduces conference quality.

SUMMARY

Embodiments of the present disclosure provide a call processing method and an electronic device.

According to a first aspect, an embodiment of the present disclosure provides a call processing method, which is applied to an electronic device, and includes:

in a case that a call is connected successfully, obtaining the number of speakers in the current call;

when the number of speakers is greater than a preset threshold, determining whether a user of the electronic device is a target user;

if the user of the electronic device is a non-target user, disabling a speaking channel of the electronic device; and if the user of the electronic device is a target user, keeping the speaking channel of the electronic device on.

According to a second aspect, an embodiment of the present disclosure provides an electronic device, including:

an obtaining module, configured to: in a case that a call is connected successfully, obtain the number of speakers in the current call;

a first determining module, configured to: when the number of speakers is greater than a preset threshold, determine whether a user of the electronic device is a target user;

a first processing module, configured to: if the user of the electronic device is a non-target user, disable a speaking channel of the electronic device; and a second processing module, configured to: if the user of the electronic device is a non-target user, keep the speaking channel of the electronic device on.

According to a third aspect, an embodiment of the present disclosure further provides an electronic device, including a processor, a memory, and a computer program that is stored in the memory and that can run on the processor, and when the computer program is executed by the processor, steps in the foregoing call processing method are implemented.

According to a fourth aspect, an embodiment of the present disclosure further provides a computer-readable storage medium, where the computer-readable storage medium stores a computer program, and when the computer program is executed by a processor, steps in the foregoing call processing method are implemented.

In this way, in the embodiments of the present disclosure, in a case that a call is connected successfully, the number of speakers in the current call is obtained, so that when the number of speakers is greater than the preset threshold, it is determined whether the user of the electronic device is a target user with the right to speak, so that targeted speech control is performed for a user type, that is, for a non-target user, the speaking channel of the electronic device is disabled, and for the target user, the speaking channel of the electronic device is kept on. In this way, mutual interference caused when multiple speakers speak at the same time during a call can be avoided, thereby improving call quality.

DETAILED DESCRIPTION

The following describes the present disclosure in detail with reference to the accompanying drawings and embodiments.

Figure 1:
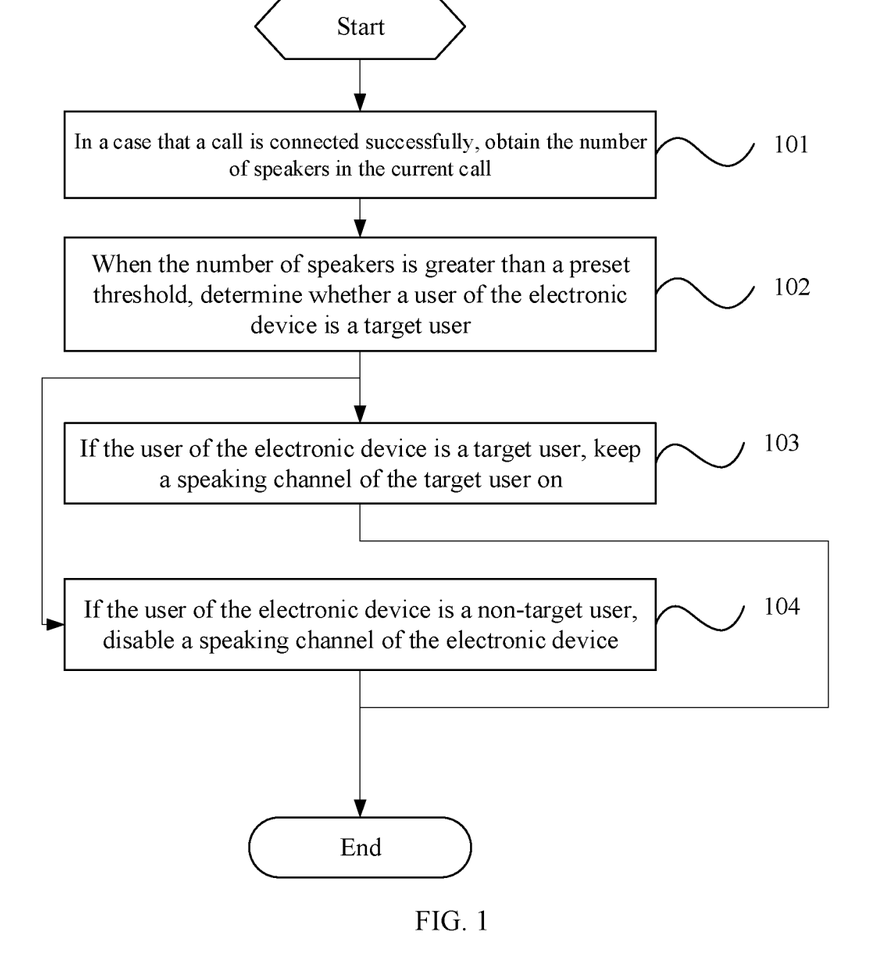
FIG. 1 is a schematic flowchart of a call processing method according to an embodiment of the present disclosure.

As shown in FIG. 1, an embodiment of the present disclosure provides a call processing method, which is applied to an electronic device, and includes:

Step 101: In a case that a call is connected successfully, obtain the number of speakers in the current call.

In this step, in a case that a call is connected successfully, the number of speakers in the current call is obtained, to distinguish a scenario in which there are multiple speakers in a call, so as to perform targeted management.

Step 102: When the number of speakers is greater than a preset threshold, determine whether a user of the electronic device is a target user.

In this embodiment, the target user is set to a user with the right to speak. In this step, when the number of speakers obtained in step 101 is greater than the preset threshold, it is further determined whether the user of the electronic device is the target user, to perform adaptive speaking control in subsequent steps.

Step 103: If the user of the electronic device is a non-target user, disable a speaking channel of the electronic device.

In this step, when it is determined in step 102 that the user of the electronic device is a non-target user, the speaking channel of the electronic device is disabled, to avoid interference to speaking of the target user.

Step 104: If the user of the electronic device is a target user, keep a speaking channel of the target user on.

In this step, when the user of the electronic device is determined as the target user in step 102, the speaking channel is kept on. In this case, a speaking channel of an electronic device of the non-target user in the call is disabled.

In this way, based on step 101 to step 104, in the call processing method in this embodiment of the present disclosure, in a case that a call is connected successfully, the number of speakers in the current call is obtained, so that when the number of speakers is greater than the preset threshold, it is determined whether the user of the electronic device is a target user with the right to speak, so that targeted speech control is performed for a user type, that is, for the non-target user, the speaking channel of the electronic device is disabled, and for the target user, the speaking channel of the electronic device is kept on. In this way, mutual interference caused when multiple speakers speak at the same time during a call can be avoided, thereby improving call quality.

The preset threshold may be 1, that is, when there are two or more speakers in the current call, it is determined to perform speaking control for the target user. The preset value is configured in advance, and may be another value.

The method in this embodiment may be applied to a remote conference scenario. For example, a user A initiates a remote conference attended by the user A, a user B, and a user C, and implementation of the method in this embodiment is described as follows by using an electronic device X used by the user B.

In a case that a call is connected successfully, the electronic device X obtains the number of speakers in the current call. The number of speakers may be counted by the user equipment X, or may be counted by a remote conference server. It is assumed that the preset threshold is 1, and the user A and the current call user B are speaking in the current call, that is, the number of speakers is 2. In this case, because the number of speakers is greater than the preset threshold, it is determined whether the user B is a target user. If the user B is a non-target user, a speaking channel of the user equipment X is disabled. If the user B is the target user, the speaking channel of the user equipment X is kept on. Electronic devices of the user A and the user C also use the method in this embodiment. In this way, in the current remote conference, impact exerted by speaking of a non-target user in the user A, the user B, and the user C on speaking of the target user may be avoided, and conference call quality is improved.

In some embodiments, the target user is a user who speaks first in the speakers, or a user who initiates the call.

The foregoing example of a remote conference is still used. In a case that the user A and the user B are speaking in the current call, the user B who speaks first may be used as the target user according to a speaking time sequence of the user A and the user B. The speaking time is recorded by the remote conference server, and the electronic device used by the user is notified. In some embodiments, the user who initiates the call, that is, the user A, is used as the target user. The target user may be a speaker who is set by the originating user before the call to speak first. The number of target users is 1, but is not limited to 1, and may be preset according to a requirement.

In this embodiment, the method further includes:
when the call is connected successfully, displaying a call indication interface; where the call indication interface includes a first item and a second item, the first item indicates whether the user of the electronic device has the right to speak, and the second item indicates whether the user of the electronic device has the right to interrupt through speaking.

In this way, the call display interface can use the first item to indicate whether the user of the electronic device has the right to speak, and use the second item to indicate whether the user of the electronic device has the right to interrupt through speaking. The right to speak is the right to speak of the target user. The first item and the second item may be implemented by using text, an icon, or a combination thereof. However, based on different indication meanings, display statuses of the first item and the second item are also different, such as a change of text content and a change of icon color.

Figure 2:
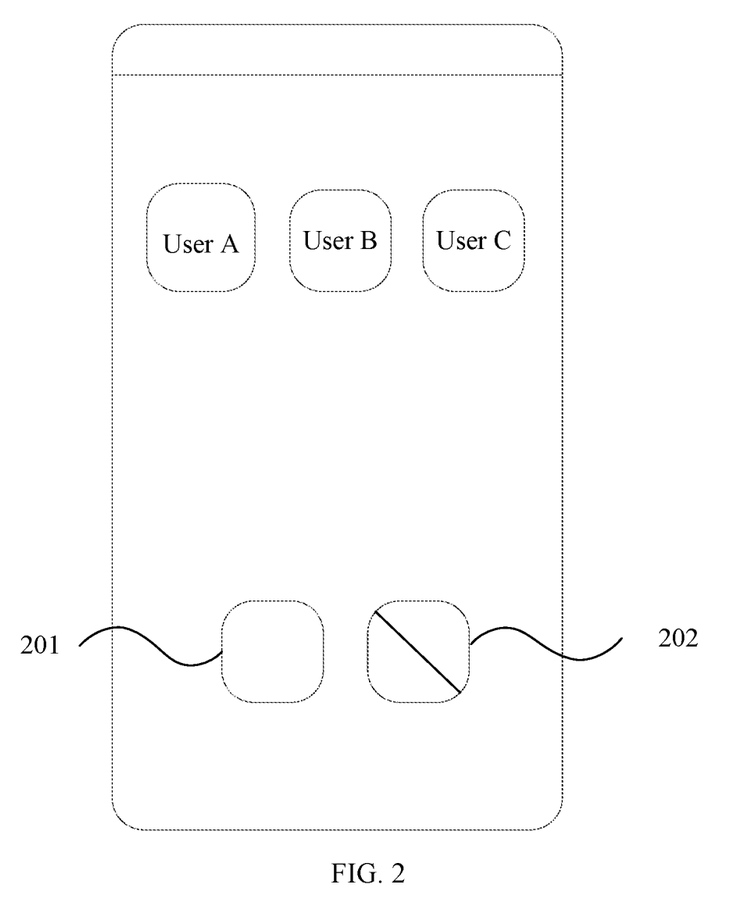
FIG. 2 is a first schematic diagram of a call display interface according to an embodiment of the present disclosure.
Figure 3:
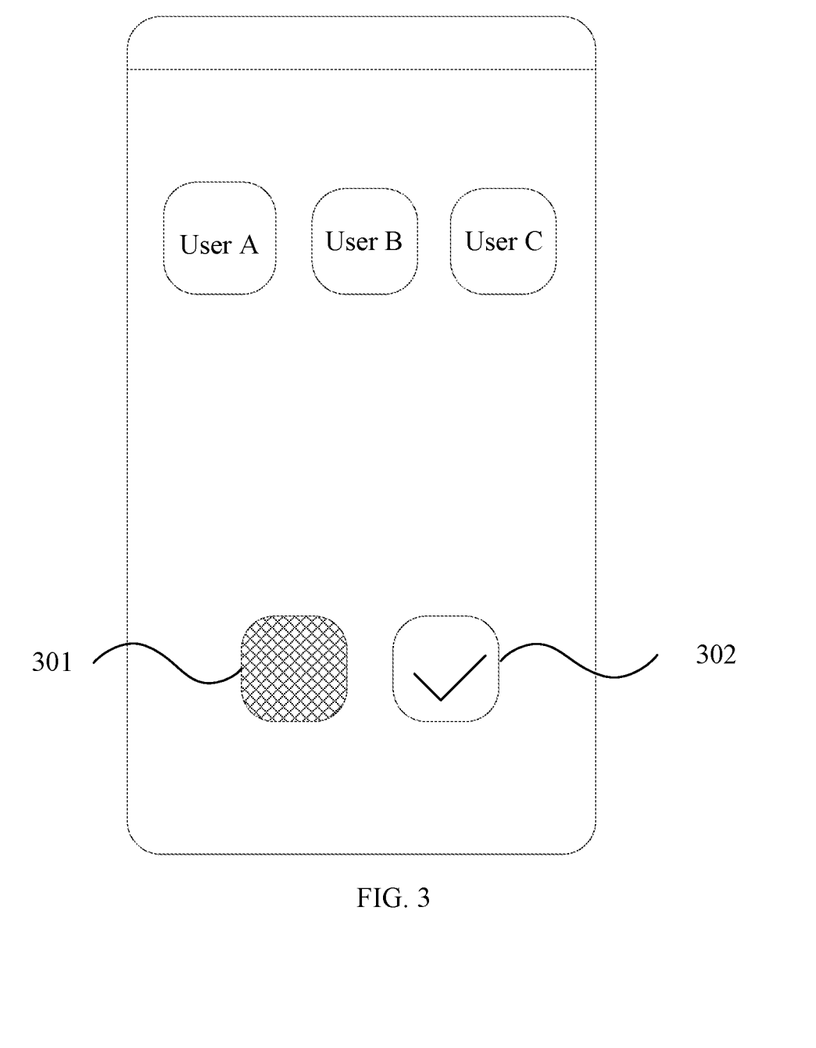
FIG. 3 is a second schematic diagram of a call display interface according to an embodiment of the present disclosure.

For example, in a call indication interface of the target user that is shown in FIG. 2, a first item 201 uses a first state to indicate that the user has the right to speak, and a second item 202 uses a first state to indicate that the user does not have the right to interrupt through speaking. In a call indication interface of the non-target user that is shown in FIG. 3, a first item 301 changes a second state to indicate that the user does not have the right to speak, and a second item 302 changes a second state to indicate that the user has the right to interrupt through speaking. Both a state used by the first item to indicate that the user does not have the right to speak and a state used by the second item to indicate that the user does not have the right to interrupt through speaking may be hidden and not displayed.

In an initial stage at which the call is connected successfully, all users participating in the call have the right to speak. In call indication interfaces of electronic devices of all the users, a first item indicates that the user has the right to speak, and a second item indicates that the user does not have the right to interrupt through speaking.

In addition, in this embodiment, in addition to the first item and the second item, the call indication interface may further include content such as an image, call duration, and a speaker indication of all users participating in the call.

In addition, in this embodiment, after the displaying a call indication interface, the method further includes:
when the second item indicates that the user of the electronic device has the right to interrupt through speaking, receiving a first input by the user of the electronic device; and
in response to the first input, enabling a speaking channel of the electronic device within first preset duration.

Herein, the first input is an input triggered by the user to interrupt, may be touching and holding an interrupt key on the call indication interface, or may be a keyword such as "interrupt", "pause", or "stop" for voice input. In this way, in a case that the user has the right to interrupt through speaking, the electronic device may enable, by receiving the first input, the speaking channel of the electronic device within the first preset duration, so that the user and the target user can also speak.

However, because the speech of an interrupter is brief and is limited by the first preset duration, the interrupter still has no right to speak as the target user; in other words, the first item on the call indication interface indicates that the user does not have the right to speak, for example, an indicator is red. In addition, to avoid too many interrupters, it is often set that at most one interrupter exists in the call. When a user interrupts, other users participating in the call do not have the right to interrupt through speaking.

In some embodiments, after the enabling a speaking channel of the electronic device within first preset duration, the method further includes:

detecting whether the target user speaks in second preset duration;

if the target user does not speak, determining the user of the electronic device as the target user; and if the target user speaks, disabling the speaking channel of the electronic device after the first preset duration.

In this way, after the user is used as an interrupter, and the electronic device enables a speaking channel for the user, speech of the target user is detected. In a case that the target user does not speak within the second preset duration, the interrupter is determined as the target user, and takes over the right to speak. In this case, the call indication interface displayed on the electronic device is shown in FIG. 2. If the target user speaks within the second preset duration, after the first preset duration, the electronic device disables the speaking channel. The second preset duration is less than the first preset duration.

In this embodiment, after the electronic device enables the speaking channel for interrupting, the call indication interface may further perform countdown display based on the first preset duration, to provide a talk indication for the interrupter.

In addition, in this embodiment, the method further includes:

if it is detected that no user speaks within third preset duration, enabling the speaking channel of the electronic device.

In this way, in a case that no user speaks within the third preset duration, all users participating in the call have the right to speak. In this case, the call indication interface displayed on the electronic device is shown in FIG. 2.

For example, in a case that no user speaks within the third preset duration after the target user talks, or in a case that no user talks within the third preset duration after the interrupter speaks, all users participating in the call have the right to speak, and the call is in a waiting-to-speak state. For example, in addition to what shown in FIG. 2, the call indication interface further displays "waiting to speak".

In this embodiment, the method further includes:

when the call is connected successfully, performing at least one of the following processing for the current call:

voice enhancement; and call noise reduction.

In this way, during a call, the user's voice is enhanced and/or call noise reduction processing is performed to avoid impact of the noise on the user's speech. For example, noise generated by turning on a microphone and background noise caused when the user speaks may be filtered through noise reduction processing. For identified user voice, voice enhancement processing for turning up volume is performed.

The following describes application of the method in this embodiment of the present disclosure with reference to an exemplary scenario.

A user of an electronic device Y participates in a remote conference. In an initial stage at which a call is connected successfully, the user speaks. The electronic device Y obtains the number of users in the current call, and when the number of users is greater than a preset threshold, determines whether the user is a target user and performs indication by using a speaking indicator (that is, a first item) on a call indication interface. If the user is a non-target user, the electronic device disables a speaking channel, and the speaking indicator is red (indicating that the user does not have the right to speak). If the user is the target user, the electronic device keeps the speaking channel on, and the speaking indicator is green (indicating that the user has the right to speak).

In a case that the user does not have the right to speak, the user may learn, according to an indication in a second item, whether the user has the right to interrupt through speaking, to trigger, in a case that the user has the right to interrupt through speaking, the electronic device Y to enable a speaking channel in first preset duration to obtain speaking time in the first preset duration. Within the first preset duration, it is detected, based on second preset duration, whether the target user speaks. If the target user does not speak, the right to speak may be given to the user, that is, the user is determined as the target user. If the target user speaks, a speaking channel enabled for interrupting is disabled after the first preset duration expires.

Based on the third preset time length, if no user speaks at the conference, the conference enters a waiting-to-speak state, and speaking indicators on call indication interfaces of electronic devices of all participating users are green.

In conclusion, in the call processing method in this embodiment of the present disclosure, in a case that a call is connected successfully, the number of speakers in the current call is obtained, so that when the number of speakers is greater than the preset threshold, it is determined whether the user of the electronic device is a target user with the right to speak, so that targeted speech control is performed for a user type, that is, for the non-target user, the speaking channel of the electronic device is disabled, and for the target user, the speaking channel of the electronic device is kept on. In this way, mutual interference caused when multiple speakers speak at the same time during a call can be avoided, thereby improving call quality.

Figure 4:
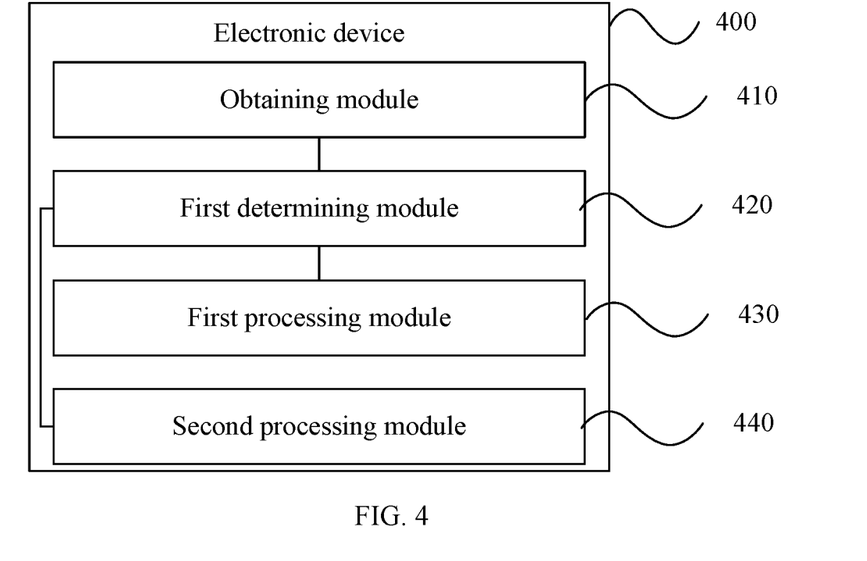
FIG. 4 is a schematic structural diagram of an electronic device according to an embodiment of the present disclosure.

FIG. 4 is a block diagram of an electronic device according to an embodiment of the present disclosure. An electronic device 400 shown in FIG. 4 includes an obtaining module 410, a first determining module 420, a first processing module 430, and a second processing module 440.

The obtaining module 410 is configured to: in a case that a call is connected successfully, obtain the number of speakers in the current call.

The first determining module 420 is configured to: when the number of speakers is greater than a preset threshold, determine whether a user of the electronic device is a target user.

The first processing module 430 is configured to: if the user of the electronic device is a non-target user, disable a speaking channel of the electronic device.

The second processing module 440 is configured to: if the user of the electronic device is a non-target user, keep the speaking channel of the electronic device on.

In some embodiments, the target user is a user who speaks first in the speakers, or a user who initiates the call.

In some embodiments, the electronic device further includes:
a display module, configured to: when the call is connected successfully, display a call indication interface; where
the call indication interface includes a first item and a second item, the first item indicates whether the user of the electronic device has the right to speak, and the second item indicates whether the user of the electronic device has the right to interrupt through speaking.

In some embodiments, the electronic device further includes:
a receiving module, configured to: when the second item indicates that the user of the electronic device has the right to interrupt through speaking, receive a first input by the user of the electronic device; and
a third processing module, configured to: in response to the first input, enable a speaking channel of the electronic device within first preset duration.

In some embodiments, the electronic device further includes:
a detection module, configured to detect whether the target user speaks in second preset duration;
a second determining module, configured to: if the target user does not speak, determine the user of the electronic device as the target user; and
a fourth processing module, configured to: if the target user speaks, disable the speaking channel of the electronic device after the first preset duration.

In some embodiments, the electronic device further includes:
a fifth processing module, configured to: if it is detected that no user speaks within third preset duration, enable the speaking channel of the electronic device.

In some embodiments, the electronic device further includes:
a sixth processing module, configured to: when the call is connected successfully, perform at least one of the following processing for the current call:
voice enhancement; and
call noise reduction.

The electronic device 400 can implement processes implemented by the electronic device in the foregoing method embodiments in FIG. 1 to FIG. 3. To avoid repetition, details are not described herein again. The electronic device in this embodiment of the present disclosure obtains the number of speakers in a current call when the call is connected successfully, so that when the number of speakers is greater than the preset threshold, determines whether the user of the electronic device is a target user with the right to speak, to perform targeted speech control for a user type, that is, for the non-target user, disable the speaking channel of the electronic device, and for the target user, keep the speaking channel of the electronic device on. In this way, mutual interference caused when multiple speakers speak at the same time during a call can be avoided, thereby improving call quality.

Figure 5:
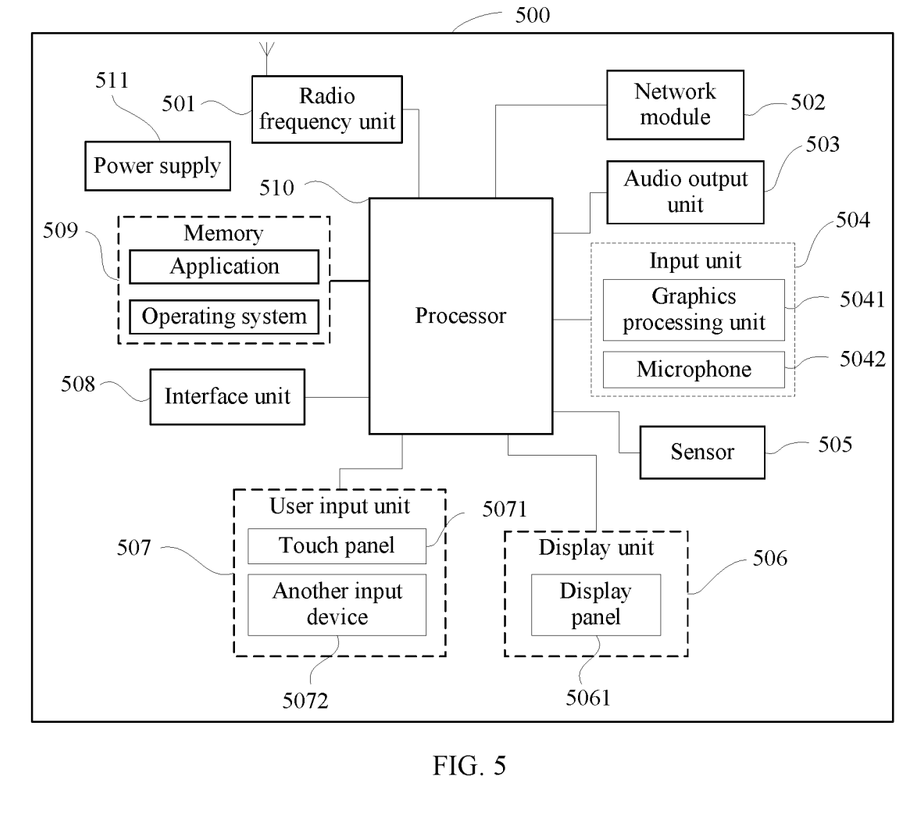
FIG. 5 is a schematic structural diagram of an electronic device according to another embodiment of the present disclosure.

FIG. 5 is a schematic diagram of a hardware structure of an electronic device for implementing embodiments of the present disclosure. The electronic device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the electronic device shown in FIG. 5 does not constitute a limitation on the electronic device, and the electronic device may include more or fewer components than those shown in the figure, or combine some components, or have different component arrangements. In this embodiment of the present disclosure, the electronic device includes but is not limited to a mobile phone, a tablet computer, a laptop computer, a palmtop computer, an in-vehicle terminal, a wearable device, a pedometer, and the like.

The processor 510 is configured to: in a case that a call is connected successfully, obtain the number of speakers in the current call;
when the number of speakers is greater than a preset threshold, determine whether a user of the electronic device is a target user;
if the user of the electronic device is a non-target user, disable a speaking channel of the electronic device; and
if the user of the electronic device is a target user, keep the speaking channel of the electronic device on.

It can be learned that the electronic device obtains the number of speakers in a current call when the call is connected successfully, so that when the number of speakers is greater than the preset threshold, determines whether the user of the electronic device is a target user with the right to speak, to perform targeted speech control for a user type, that is, for the non-target user, disable the speaking channel of the electronic device, and for the target user, keep the speaking channel of the electronic device on. In this way, mutual interference caused when multiple speakers speak at the same time during a call can be avoided, thereby improving call quality.

It should be understood that, in this embodiment of the present disclosure, the radio frequency unit 501 may be configured to receive and send information or receive and send a signal in a call process. In some embodiments, after downlink data from a base station is received, the processor 510 processes the downlink data. In addition, uplink data is sent to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communication system.

The electronic device provides wireless broadband Internet access for the user by using the network module 502, for example, helping the user send and receive an email, browse a web page, and access streaming media.

The audio output unit 503 may convert audio data received by the radio frequency unit 501 or the network module 502 or stored in the memory 509 into an audio signal and output as sound. In addition, the audio output unit 503 may further provide audio output (for example, call signal receiving sound or message receiving sound) related to a function performed by the electronic device 500. The audio output unit 503 includes a loudspeaker, a buzzer, a telephone receiver, and the like.

The input unit 504 is configured to receive an audio or video signal. The input unit 504 may include a Graphics Processing Unit (GPU) 5041 and a microphone 5042. The graphics processing unit 5041 processes image data of a static picture or a video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process such sound into audio data. The processed audio data may be output by being converted into a format that may be sent to a mobile communications base station by using the radio frequency unit 501 in a telephone call mode.

The electronic device 500 further includes at least one sensor 505, such as an optical sensor, a motion sensor, and another sensor. In some embodiments, the optical sensor includes an ambient light sensor and a proximity sensor. The ambient light sensor may adjust luminance of a display panel 5061 based on brightness of ambient light, and the proximity sensor may disable the display panel 5061 and/or backlight when the electronic device 500 approaches an ear. As a type of the motion sensor, an accelerometer sensor may detect magnitude of an acceleration in each direction (generally three axes), and may detect magnitude and a direction of gravity when being static. The accelerometer sensor may be used for recognizing an electronic device gesture (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include a display panel 5061, and the display panel 5061 may be configured in a form of a Liquid Crystal Display (LCD), an Organic Light-Emitting Diode (OLED), or the like.

The user input unit 507 may be configured to receive input digit or character information and generate key signal input related to user setting and function control of the electronic device. In some embodiments, the user input unit 507 includes a touch panel 5071 and another input device 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 510, and can receive and execute a command sent by the processor 510. In addition, the touch panel 5071 may be implemented by using multiple types such as a resistive type, a capacitive type, an infrared ray, and a surface acoustic wave. The user input unit 507 may include another input device 5072 in addition to the touch panel 5071. In some embodiments, the another input device 5072 may include but is not limited to one or more of a physical keyboard, a function key (such as a volume control key or an on/off key), a trackball, a mouse, a joystick, and the like. Details are not described herein.

Further, the touch panel 5071 may cover the display panel 5061. After detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. In FIG. 5, the touch panel 5071 and the display panel 5061 are used as two independent components to implement input and output functions of the electronic device. However, in some embodiments, the touch panel 5071 and the display panel 5061 may be integrated to implement the input and output functions of the electronic device. This is not specifically limited herein.

The interface unit 508 is an interface connecting an external apparatus to the electronic device 500. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 508 may be configured to receive input (for example, data information and power) from the external apparatus and transmit the received input to one or more elements in the electronic device 500, or may be configured to transmit data between the electronic device 500 and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, and may further include a non-volatile memory such as at least one magnetic disk storage component, a flash memory component, or another volatile solid-state storage component.

The processor 510 is a control center of the electronic device, and is connected to all parts of the entire electronic device by using various interfaces and lines, and performs various functions of the electronic device and processes data by running or executing the software program and/or the module that are stored in the memory 509 and invoking the data stored in the memory 509, to implement overall monitoring on the electronic device. The processor 510 may include one or more processing units. In some embodiments, the processor 510 may be integrated with an application processor and a modem processor. The application processor mainly processes an operating system, a user interface, an application program, and the like, and the modem processor mainly processes wireless communication. It may be understood that the modem processor may also not be integrated into the processor 510.

The electronic device 500 may further include a power supply 511 (such as a battery) that supplies power to each component. For example, the power supply 511 may be logically connected to the processor 510 by using a power management system, to implement functions such as charging, discharging, and power consumption management by using the power management system.

In addition, the electronic device 500 includes some function modules not shown, and details are not described herein.

An embodiment of the present disclosure further provides a mobile terminal, including a processor, a memory, and a computer program that is stored in the memory and that can run on the processor. When the computer program is executed by the processor, the processes of the foregoing call processing method shown in the foregoing method embodiments are implemented, and a same technical effect can be achieved. To avoid repetition, details are not described herein.

An embodiment of the present disclosure further provides a computer-readable storage medium. A computer program is stored in the computer-readable storage medium. When being executed by a processor, processes of the embodiments of the foregoing call processing method can be implemented, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A call processing method, performed by an electronic device, the call processing method comprising:
   in response to a call being connected successfully, obtaining a number of speakers in the call;
   in response to a determination that the number of speakers is greater than a preset threshold, determining whether a user of the electronic device is a target user or a non-target user;
   in response to the determination that the user of the electronic device is the non-target user, disabling a speaking channel of the electronic device;
   after disabling the speaking channel of the electronic device, receiving a first input from the non-target user when the non-target user has a right to interrupt through speaking, wherein the first input is an input triggered by the non-target user to interrupt, wherein the first input comprises touching and holding an interrupt key on a call indication interface; and
   in response to the first input, enabling the speaking channel of the electronic device for a first preset duration for the non-target user to speak in addition to the target user, without a right to interrupt from other speakers in the call.

2. The call processing method according to claim 1, further comprising:
   in response to the determination that the user of the electronic device is the target user, keeping the speaking channel of the electronic device on, wherein the target user is a user who speaks first in the speakers or a user who initiates the call.

3. The call processing method according to claim 1, further comprising:
   when the call is connected successfully, displaying the call indication interface; wherein
   the call indication interface comprises a first item and a second item, wherein the first item indicates whether the user of the electronic device has the right to speak, and the second item indicates whether the user of the electronic device has the right to interrupt through speaking.

4. The call processing method according to claim 3, after the displaying the call indication interface, further comprising:
   when the second item indicates that the user of the electronic device has the right to interrupt through speaking, receiving the first input by the user of the electronic device.

5. The call processing method according to claim 1, after the enabling the speaking channel of the electronic device for the first preset duration, further comprising:
   detecting whether the target user speaks in a second preset duration after the first preset duration expires, wherein the second preset duration is less than the first preset duration;
   when the target user does not speak, determining the user of the electronic device as the target user; and
   when the target user speaks, disabling the speaking channel of the electronic device after the first preset duration.

6. The call processing method according to claim 1, further comprising:
   when it is detected that no user speaks within third preset duration, enabling the speaking channel of the electronic device.

7. An electronic device, comprising: a memory having a computer program stored thereon; and a processor, wherein the computer program, when executed by the processor, causes the processor to perform operations comprising:
   in response to a call being connected successfully, obtaining a number of speakers in the call;
   in response to a determination that the number of speakers is greater than a preset threshold, determining whether a user of the electronic device is a target user or a non-target user;
   in response to the determination that the user of the electronic device is the non-target user, disabling a speaking channel of the electronic device;
   after disabling the speaking channel of the electronic device, receiving a first input from the non-target user when the non-target user has a right to interrupt through speaking, wherein the first input is an input triggered by the non-target user to interrupt, wherein the first input comprises touching and holding an interrupt key on a call indication interface; and
   in response to the first input, enabling the speaking channel of the electronic device for a first preset duration for the non-target user to speak in addition to the target user, without a right to interrupt from other speakers in the call.

8. The electronic device according to claim 7, wherein the operations further comprise:
in response to the determination that the user of the electronic device is the target user, keeping the speaking channel of the electronic device on, wherein the target user is a user who speaks first in the speakers or a user who initiates the call.

9. The electronic device according to claim 7, wherein the operations further comprise:
when the call is connected successfully, displaying the call indication interface; wherein
the call indication interface comprises a first item and a second item, wherein the first item indicates whether the user of the electronic device has the right to speak, and the second item indicates whether the user of the electronic device has the right to interrupt through speaking.

10. The electronic device according to claim 9, wherein the operations further comprise:
when the second item indicates that the user of the electronic device has the right to interrupt through speaking, receiving the first input by the user of the electronic device.

11. The electronic device according to claim 7, wherein the operations further comprise:
detecting whether the target user speaks in a second preset duration after the first preset duration expires, wherein the second preset duration is less than the first preset duration;
when the target user does not speak, determining the user of the electronic device as the target user; and
when the target user speaks, disabling the speaking channel of the electronic device after the first preset duration.

12. The electronic device according to claim 7, wherein the operations further comprise:
when it is detected that no user speaks within third preset duration, enabling the speaking channel of the electronic device.

13. A non-transitory computer-readable storage medium storing a computer program, wherein the computer program, when executed by a processor, causes the processor to perform a call processing method, comprising:
in response to call being connected successfully, obtaining a number of speakers in the call;
in response to a determination that the number of speakers is greater than a preset threshold, determining whether a user of the electronic device is a target user or a non-target user;
in response to the determination that the user of the electronic device is the non-target user, disabling a speaking channel of the electronic device;
after disabling the speaking channel of the electronic device, receiving a first input from the non-target user when the non-target user has a right to interrupt through speaking, wherein the first input is an input triggered by the non-target user to interrupt, wherein the first input comprises touching and holding an interrupt key on a call indication interface; and
in response to the first input, enabling the speaking channel of the electronic device for a first preset duration for the non-target user to speak in addition to the target user, without a right to interrupt from other speakers in the call.

14. The non-transitory computer-readable storage medium according to claim 13, wherein the call processing method further comprises:
in response to the determination that the user of the electronic device is the target user, keeping the speaking channel of the electronic device on, wherein the target user is a user who speaks first in the speakers or a user who initiates the call.

15. The non-transitory computer-readable storage medium according to claim 13, wherein the method further comprises:
when the call is connected successfully, displaying the call indication interface; wherein
the call indication interface comprises a first item and a second item, wherein the first item indicates whether the user of the electronic device has the right to speak, and the second item indicates whether the user of the electronic device has the right to interrupt through speaking.

16. The non-transitory computer-readable storage medium according to claim 15, wherein after the displaying a call indication interface, the method further comprises:
when the second item indicates that the user of the electronic device has the right to interrupt through speaking, receiving the first input by the user of the electronic device.

17. The non-transitory computer-readable storage medium according to claim 13, wherein after the enabling the speaking channel of the electronic device for the first preset duration, the method further comprises:
detecting whether the target user speaks in a second preset duration after the first preset duration expires, wherein the second preset duration is less than the first preset duration;
when the target user does not speak, determining the user of the electronic device as the target user; and
when the target user speaks, disabling the speaking channel of the electronic device after the first preset duration.

18. The non-transitory computer-readable storage medium according to claim 13, wherein the method further comprises:
when it is detected that no user speaks within third preset duration, enabling the speaking channel of the electronic device.

* * * * *